UNITED STATES PATENT OFFICE.

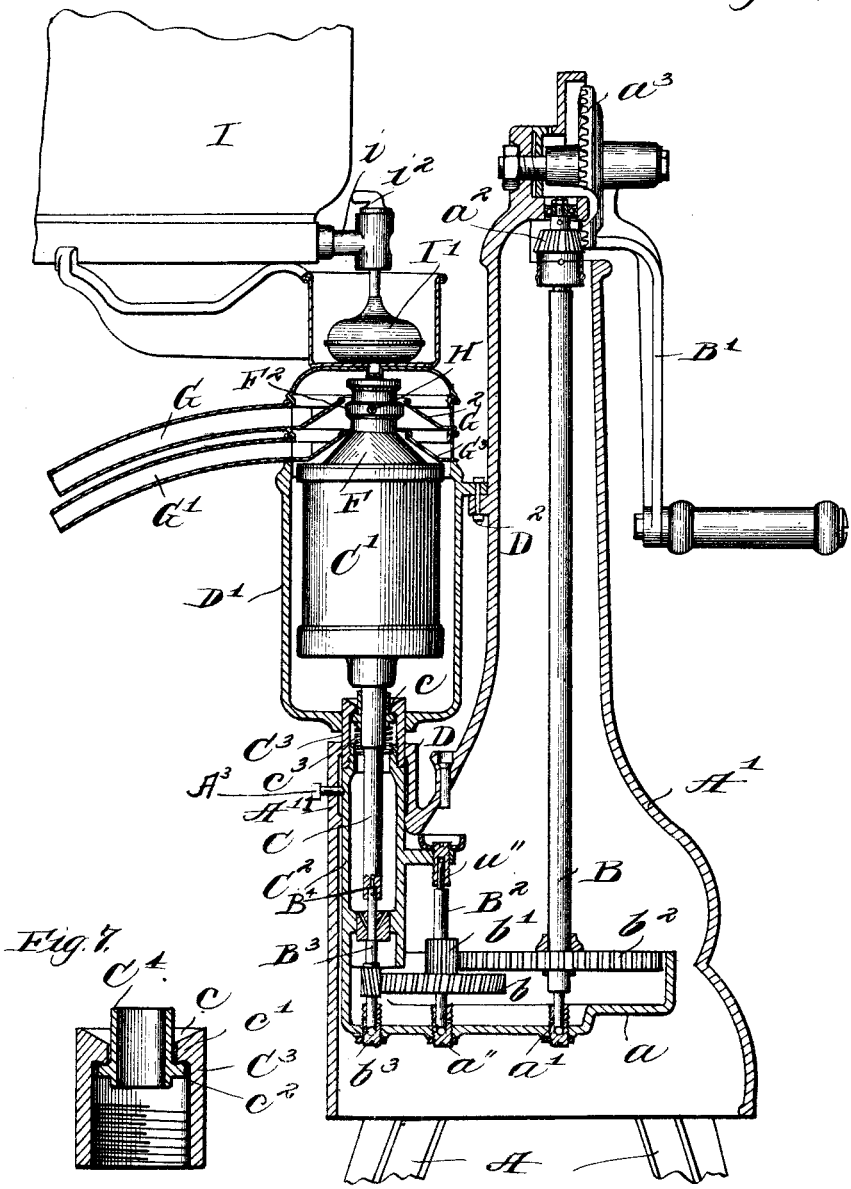

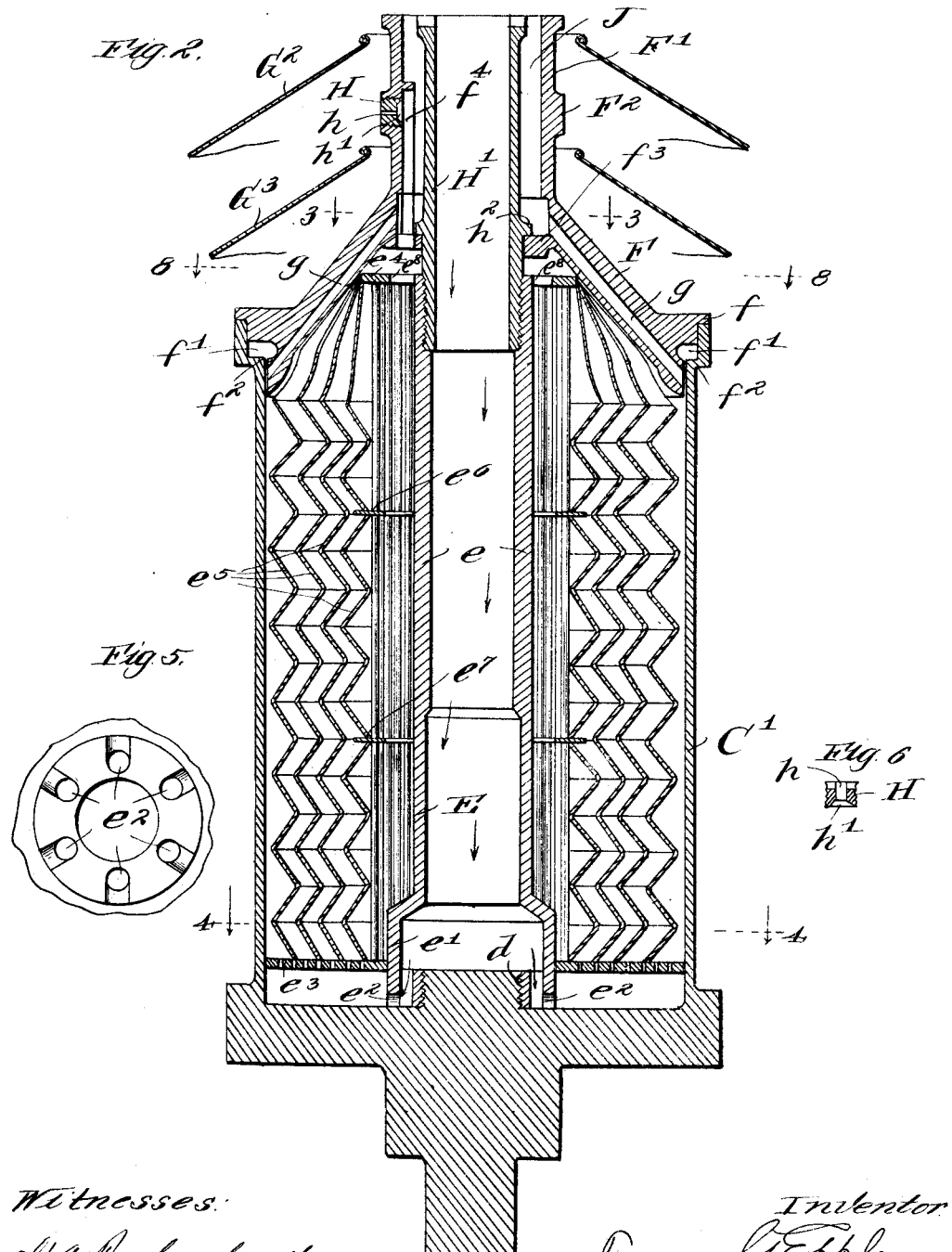

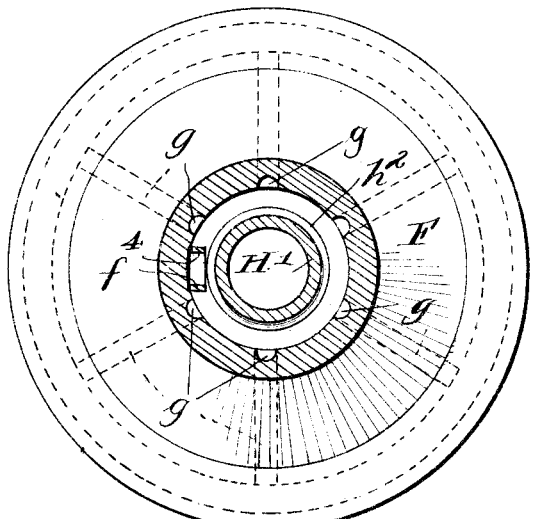
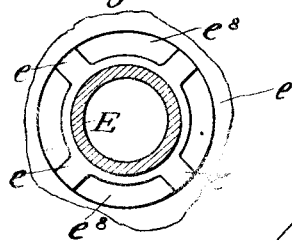
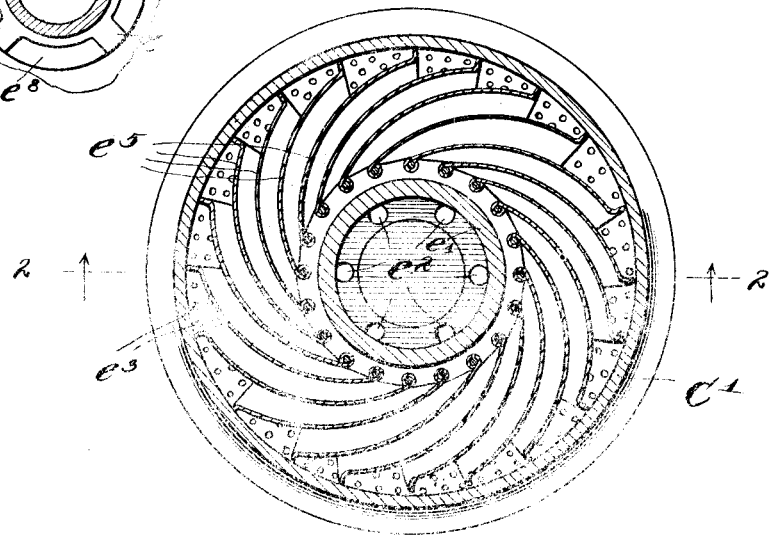

FRANCIS G. EPPLEY, OF CHICAGO, ILLINOIS, ASSIGNOR TO ALBAUGH-DOVER CO., OF CHICAGO, ILLINOIS, A CORPORATION OF ILLINOIS.

LIQUID-SEPARATOR.

1,066,393.  Specification of Letters Patent.  Patented July 1, 1913.

Application filed April 10, 1909. Serial No. 489,028.

*To all whom it may concern:*

Be it known that I, FRANCIS G. EPPLEY, a citizen of the United States, residing at Chicago, in the county of Cook and State of Illinois, have invented certain new and useful Improvements in Liquid-Separators, of which the following, taken in connection with the drawings, is a description.

This invention relates to the improvements in the general construction of liquid separators, more especially of that class known as "cream separators", but may, however, be used in separating other liquids of different specific gravities.

One of the objects of my invention is to provide a bowl having vertically arranged wings therein, and a cover for said bowl provided with milk and cream discharge openings in the neck portion thereof, through which the skim milk and cream is passed after having been separated by the mechanism hereinafter described.

Another object of my invention is to provide a flexible bearing case in which is supported the spindle carrying the skimming bowl, so arranged that the bowl is automatically maintained in perfect alinement during the operation of the machine.

A further object of my invention is to provide a construction whereby the whole milk is introduced into the bowl and during the skimming process the liquid is traveling upwardly discharging the skimmed milk and the cream from the neck of the cover of the bowl.

Other objects and features of advantage in the use of my invention will be hereinafter described and pointed out in the claims.

Various modifications in detail relating to the different parts of the machine will suggest themselves to persons skilled in the construction and use of this class of machinery; but my invention is not limited in these regards, and the forms illustrated are but embodiments of the invention.

In the accompanying drawings consisting of three sheets Figure 1 is a side elevation, partly in section, of my invention; Fig. 2 is a sectional view taken through the skimming bowl, wings and cover, on line 2—2 of Fig. 4; Fig. 3 is a view taken on line 3—3 of Fig. 2 looking in the direction of the arrow; Fig. 4 is a transverse sectional view taken on line 4—4 of Fig. 2; Fig. 5 is an enlarged end view of the tube extending through the bowl; Fig. 6 is a sectional view of the cream screw; Fig. 7 is a detail of the flexible bearing and case; Fig. 8 is a view taken on line 8—8 of Fig. 2.

Referring to the drawings A represents a base or support from which rises a casing A′ which incloses the gearing and supports the skimming apparatus. Secured to the wall of the casing A′ is a casting $a$, which forms the gear nest and supports the driving mechanism. The outer casing A′ is arranged at one side thereof to support the upper part of the gear nest within a neck portion A″, the extension $C^2$ fitting inside thereof and being held in position by a single pin or screw $A^3$.

$a'$ is the bearing in which is mounted the lower end of the driving shaft B. This shaft extends vertically to the top of the casing A and carries therein a beveled gear $a^2$ which meshes with the gear $a^3$, which is operated by any suitable source of power, in this instance a crank B′.

$B^2$ is the vertical shaft mounted in bearings $a''$, $a''$, supported inside the casing A′, carrying the gear $b$ and pinion $b'$ which latter meshes with the gear $b^2$ on the shaft B. $B^3$ is also a vertically disposed shaft, the lower end thereof resting in the bearing $b^3$ and the upper end thereof interlocking with the spindle C. Screw threaded upon the extension $C^2$ is a flexible bearing case $C^3$, the top of which is concave, as at $c$, Fig. 7, beneath which is an inwardly extending circumferential shoulder $c'$. A flexible bearing bushing $C^4$ extends into the case $C^3$ having upon one end thereof a shoulder $c^2$ which abuts against and engages the shoulder $c'$ and is held to its position by a coiled spring $c^3$ which seats against said shoulder $c^2$ and against the upper part of the casting $C^2$. This bushing allows a slight lateral movement in the casing, the tension of the spring keeping it in alinement, and maintaining the spindle C in an upright position. The spindle C engages the shaft $B^3$ at $B^4$ and when it is desired to remove the bowl it is simply raised out of the flexible bearing.

Supported above the upwardly extending portion D is the casing A′ and surrounding the bearing case $C^3$ is the supporting frame D′ for the skimming bowl C′. This frame D′ may also be secured to the main casing A′ as at $D^2$ to give it strength and rigidity.

Rising from the center of the bottom of the bowl C' (Fig. 2) is an exteriorly screw threaded boss $d$ to which is secured the feed pipe E, which extends to the top of the vertically pivoted wings $e^5$. This pipe E has a plurality of ribs $e$ extending from the top thereof to the enlarged portion $e'$ at the base. The enlarged portion $e'$ extends over the base $d$ and has through the bottom thereof the openings $e^2$ communicating from the interior of said tube to the bowl C'.

Surrounding the enlarged portion $e'$ at the base of the feed pipe E is a perforated disk $e^3$ and surrounding the top of said tube E is a collar $e^4$, and pivotally secured to the top of said collar $e^4$ and at the bottom of the disk $e^3$ are the wings $e^5$, which are supported mediate of their length by the rings $e^6$, $e^7$. These wings are curved (Fig. 4) and extend tangentially around the axis of the bowl, nesting together as shown, with their concave sides turned in the direction the bowl rotates.

A removable cover F, cone shaped at the bottom thereof, fits over the top of the bowl C'. The base of this cover is provided with a flange $f$, which rests upon the top of the bowl C' (Fig. 2). The base of the cover F is provided with a circumferential groove $f'$ which receives a packing ring, and when in position rests upon the abutment $f^2$ near the top of the bowl C'. The base of the cover extending inside of the bowl and beneath the packing ring is of sufficiently smaller diameter to permit the passage of the skim milk from the bowl to the discharge tubes $g$, $g$, leading to the outlets G, G'. These tubes are arranged upon the under side of the cone and discharge into the neck F², as shown more clearly in Fig. 3. At the point of the discharge into the neck F² is an integrally formed collar $f^3$ having a smaller diameter than the neck F'. Formed upon the inside of the neck, and extending upwardly from the collar $f^3$ are the ribs $f^4$ which rise above an opening through the shoulder F². A cream screw H fits into this opening and may be adjusted nearer to or farther from the axis of rotation. This screw H is provided with a central opening $h$ and has upon the inner face thereof a cone-shaped recess $h'$ through which the cream passes to the discharge orifice.

F is a neck formed integrally with the cone-shaped portion of the cover and rises upwardly therefrom. A shoulder F² extends around the neck approximately mediate of the length thereof, and arranged above this shoulder is the pan G² receiving the skim milk, and below the shoulder is the pan G³ receiving the cream.

Extending through the neck of the cover is a tube H' exteriorly screw threaded upon the lower end thereof, and having a circumferential shoulder $h^2$ which rests upon the collar $f^3$. The interior of the tube E is screw threaded at the top thereof to receive the tube H', and when secured in position as shown in Fig. 2 securely locks together the cover F and the bowl C'.

Suitably supported above the bowl C' is the supply receptacle I, having a discharge pipe $i$ controlled by a valve $i^2$, through which the whole milk flows to the feed pipe H', the supply thereof being regulated also by the float I', which automatically closes the passage to the tube when the desired amount of milk has passed into the separator.

The operation of the machine is as follows: The parts of the skimming bowl are all assembled as shown in Fig. 2, the milk is fed through the tubes H' and E to the bottom of the bowl C' when it rises through the perforations in the disk $e^3$ in the spaces between the wings $e^5$. The bowl is being revolved at a very high rate of speed, which tends to throw the outer free edges of the wings $e^5$ against the inside of the bowl C' which forms a compartment between each wing and the one next to it. The milk passes over the corrugations formed in the wings, the heavier particles traveling away from the axis of rotation and upwardly along the wall of the bowl to the openings $g$ in the cover through which it is discharged into the chamber J in the neck of the bowl, flows into the pan G² and is discharged through the spout G. The lighter cream particles travel toward the center of rotation and pass along the outside of the tube E in the open spaces between the ribs $e$ under the collar $f^3$ in the neck F², and from thence through the opening in said collar between the ribs $f^4$ to the discharge orifice $h$ in the cream screw H and into the receptacle G³ from which it is discharged through the spout G'. The bowl may easily be removed from its bearing by removing the pans G², G³, and by means of a key engaging the tube H' the cover is unlocked and removed, when the bowl may be lifted out of its bearing. The feed tube E is disengaged from the bowl by unscrewing and withdrawn with the wings $e^5$.

The driving mechanism being contained within the gear nest may be removed by loosening the pin or screw A³ allowing it to become separated from the casing A' with but one adjustment.

I claim:

1. In a liquid separator the combination of a casing, a separator bowl mounted upon a spindle, a flexible bearing permitting a slight lateral movement of the spindle, a feed tube in said bowl and detachably secured to the bottom thereof, vertical blades extending tangentially around the axis of said bowl, a cone shaped cover, a circumferential shoulder in the opening through the neck of the cover, a tube extending therethrough and having a shoulder abutting against said first named shoulder, the end of said tube engaging the first tube and locking the cover to the bowl, and mechanism for imparting a centrifugal movement to said bowl, substantially as described.

2. In a liquid separator, the combination of a casing, a flexible bearing, a separator bowl supported upon a spindle mounted in said bearing, a feed tube in said bowl and detachably secured to the bottom thereof, corrugated blades pivotally mounted at their inner edges and extending tangentially around the axis of said bowl, a cone shaped cover having a hollow neck portion, a tube extending through said neck portion and interlocking with the first named feed tube to secure the cover in position, ribs forming a cream channel upon the inside of the neck of the cover, a screw having a cone shaped orifice extending through the wall of said neck at the top of the channel, said cover having a plurality of milk discharge orifices formed integrally therewith extending from the neck thereof to the inner edge of its base, mechanism for imparting a centrifugal movement to said bowl to separate and discharge the liquids of different specific gravity, substantially as described.

In testimony whereof I have signed this specification in the presence of two subscribing witnesses.

FRANCIS G. EPPLEY.

Witnesses:
A. F. YOGGY,
E. C. METZGER.